US011198276B2

(12) United States Patent
Shim et al.

(10) Patent No.: US 11,198,276 B2
(45) Date of Patent: *Dec. 14, 2021

(54) METHOD OF FORMING A CERAMIC MATRIX COMPOSITE (CMC) COMPONENT HAVING AN ENGINEERED SURFACE

(71) Applicants: Rolls-Royce High Temperature Composites Inc., Cypress, CA (US); Rolls-Royce Corporation, Indianapolis, IN (US)

(72) Inventors: Sungbo Shim, Irvine, CA (US); Benjamin Lai, Indianapolis, IN (US)

(73) Assignees: ROLLS-ROYCE CORPORATION, Indianapolis, IN (US); ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 335 days.

This patent is subject to a terminal disclaimer.

(21) Appl. No.: 16/277,189

(22) Filed: Feb. 15, 2019

(65) Prior Publication Data

US 2019/0256427 A1 Aug. 22, 2019

Related U.S. Application Data

(60) Provisional application No. 62/631,573, filed on Feb. 16, 2018.

(51) Int. Cl.
| | |
|---|---|
| *B32B 18/00* | (2006.01) |
| *C04B 35/626* | (2006.01) |
| *C04B 35/628* | (2006.01) |
| *C04B 35/573* | (2006.01) |
| *C04B 35/80* | (2006.01) |

(52) U.S. Cl.
CPC ............ *B32B 18/00* (2013.01); *C04B 35/573* (2013.01); *C04B 35/6261* (2013.01);
(Continued)

(58) Field of Classification Search
CPC . C04B 35/657; C04B 35/806; C04B 35/6261; C04B 35/62655; C04B 35/62863; C04B 35/62892; C04B 35/62894; C04B 35/62897; C04B 2235/428;
(Continued)

(56) References Cited

U.S. PATENT DOCUMENTS

| | | | |
|---|---|---|---|
| 2,840,221 A * | 6/1958 | Carroll | A23N 4/04 198/386 |
| 5,015,540 A * | 5/1991 | Borom | C04B 35/62884 428/698 |
| 5,840,221 A * | 11/1998 | Lau | C04B 35/6269 264/29.7 |
| 6,316,048 B1 | 11/2001 | Steibel et al. | |
| 7,708,851 B2 | 5/2010 | Corman et al. | |
| 10,745,325 B2 * | 8/2020 | Shim | C04B 35/657 |

(Continued)

FOREIGN PATENT DOCUMENTS

EP 1 676 824 A1 7/2006

*Primary Examiner* — Alex B Efta
(74) *Attorney, Agent, or Firm* — Crowell & Moring

(57) ABSTRACT

A method of forming a ceramic matrix composite (CMC) component having an engineered surface includes applying a surface slurry comprising first particulate solids in a liquid carrier to an outer surface of a ceramic fiber preform. The surface slurry is dried to remove the liquid carrier, and thus a surface slurry layer comprising the first particulate solids is formed on the outer surface. The surface slurry layer is polished to a predetermined thickness and/or surface finish. After polishing, a ceramic tape comprising second particulate solids is applied to the surface slurry layer, and pressure is applied to attach the ceramic tape to the surface slurry layer and to induce consolidation of the ceramic tape and the surface slurry layer. Thus, a multilayer surface region comprising the surface slurry layer and a ceramic tape layer is formed on the ceramic fiber preform. The ceramic fiber preform and the multilayer surface region are infiltrated with a molten material, and, upon cooling, a CMC component having an engineered surface is formed.

23 Claims, 1 Drawing Sheet

(52) U.S. Cl.
CPC .. *C04B 35/62655* (2013.01); *C04B 35/62863* (2013.01); *C04B 35/62878* (2013.01); *C04B 35/62892* (2013.01); *C04B 35/62894* (2013.01); *C04B 35/62897* (2013.01); *C04B 35/80* (2013.01); *C04B 2235/3826* (2013.01); *C04B 2235/5244* (2013.01); *C04B 2235/616* (2013.01)

(58) Field of Classification Search
CPC ....... C04B 2235/612; C04B 2235/616; C04B 2235/5244; C04B 2235/3826
See application file for complete search history.

(56) References Cited

U.S. PATENT DOCUMENTS

| | | | |
|---|---|---|---|
| 2006/0141154 A1* | 6/2006 | Thebault | C04B 41/009 427/249.2 |
| 2006/0147622 A1 | 7/2006 | Gray | |
| 2007/0092762 A1* | 4/2007 | Corman | C04B 35/62871 428/701 |
| 2010/0015396 A1 | 1/2010 | Johnson et al. | |
| 2011/0151248 A1 | 6/2011 | Manicke et al. | |
| 2012/0183788 A1 | 7/2012 | Corman et al. | |
| 2016/0159066 A1* | 6/2016 | Landwehr | C04B 37/008 428/699 |
| 2016/0214907 A1* | 7/2016 | Shim | C04B 41/52 |
| 2016/0230570 A1* | 8/2016 | Harris | C04B 41/009 |
| 2016/0326064 A1* | 11/2016 | Shim | F01D 5/282 |
| 2021/0032172 A1* | 2/2021 | Shim | C04B 35/83 |

\* cited by examiner

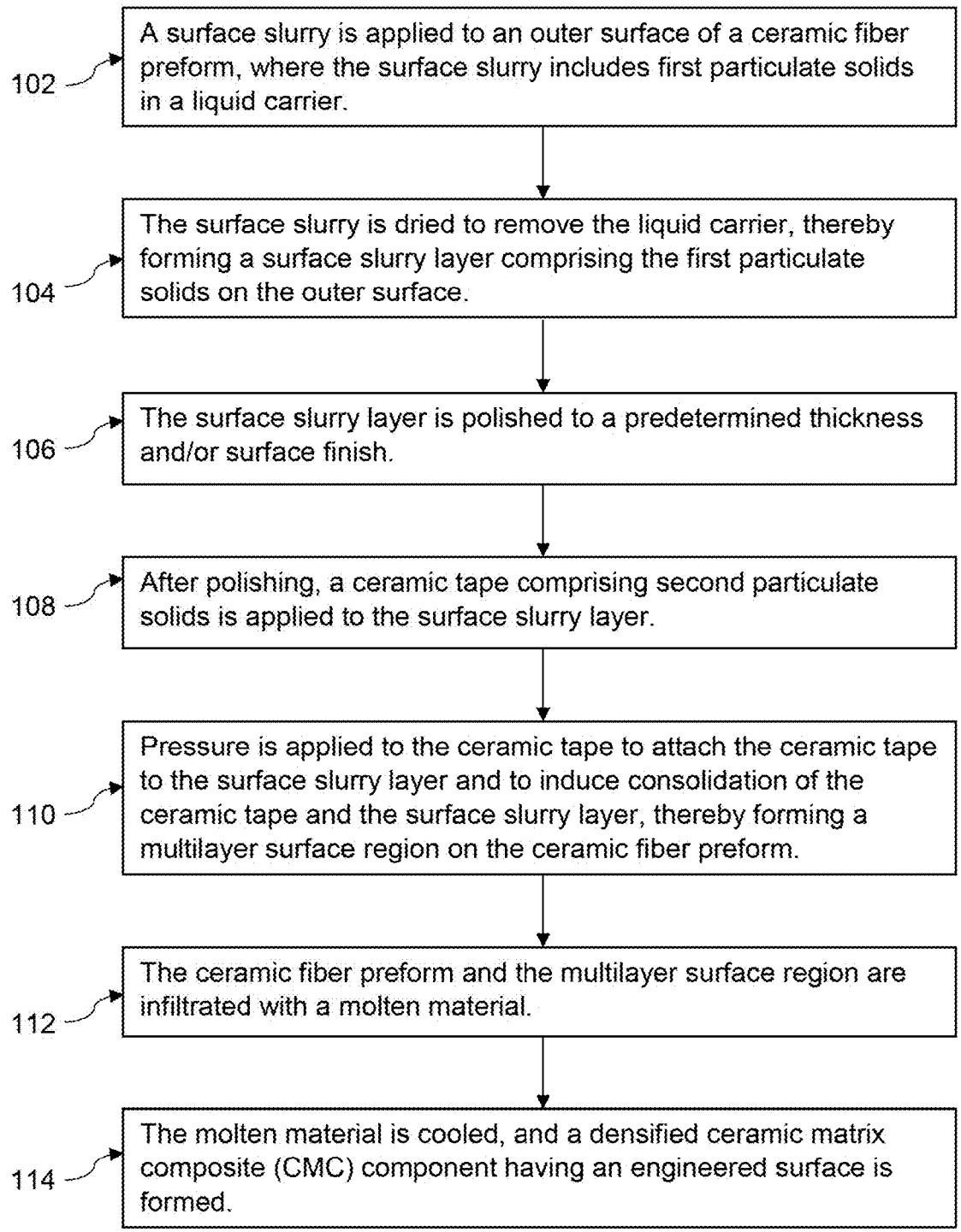

METHOD OF FORMING A CERAMIC MATRIX COMPOSITE (CMC) COMPONENT HAVING AN ENGINEERED SURFACE

RELATED APPLICATION

The present patent document claims the benefit of the filing date under 35 U.S.C. § 119(e) to U.S. Provisional Patent Application Ser. No. 62/631,573, which was filed on Feb. 16, 2018, and is hereby incorporated by reference in its entirety.

TECHNICAL FIELD

The present disclosure relates to ceramic matrix composite preparation and more particularly, to a method of preparing a ceramic matrix composite (CMC) component having a smooth surface.

BACKGROUND

Due to their low weight and higher temperature capability relative to metal-based materials, ceramic-based materials have been used in demanding environments, such as for components operating at very high temperatures. Ceramic matrix composites, which include ceramic fibers embedded in a ceramic matrix, exhibit a combination of properties that make them excellent candidates for high temperature applications that demand excellent thermal and mechanical properties along with low weight, such as gas turbine engine components. CMCs may be fabricated by melt infiltration of a ceramic fiber preform. It may be beneficial to apply an engineered surface layer on the composite to protect the fibers from physical and environmental damage during post-infiltration processing and use, such as during subsequent machining operations or when in service in a gas turbine engine.

BRIEF SUMMARY

A method of forming a ceramic matrix composite (CMC) component having an engineered surface has been developed. The method includes applying a surface slurry comprising first particulate solids in a liquid carrier to an outer surface of a ceramic fiber preform. The surface slurry is dried to remove the liquid carrier, and thus a surface slurry layer comprising the first particulate solids is formed on the outer surface. The surface slurry layer is polished to a predetermined thickness and/or surface finish. After polishing, a ceramic tape comprising second particulate solids is applied to the surface slurry layer, and pressure is applied to attach the ceramic tape to the surface slurry layer and to induce consolidation of the ceramic tape and the surface slurry layer. Thus, a multilayer surface region comprising the surface slurry layer and a ceramic tape layer is formed on the ceramic fiber preform. The ceramic fiber preform and the multilayer surface region are infiltrated with a molten material, and, upon cooling, a CMC component having an engineered surface is formed.

BRIEF DESCRIPTION OF THE DRAWINGS

FIG. 1 shows a flow chart of an embodiment of the method.

DETAILED DESCRIPTION

Described herein is a method of making a ceramic matrix composite (CMC) component including an engineered surface that may have a prescribed smoothness and/or a uniform thickness. Advantageously, the engineered surface may include multiple layers and/or local variations in composition. The engineered surface may also be grit blastable or machinable.

Referring to the flow chart of FIG. 1, the method comprises applying 102 a surface slurry to an outer surface of a ceramic fiber preform, where the surface slurry includes first particulate solids in a liquid carrier. The surface slurry is dried 104 to remove the liquid carrier, and thus a surface slurry layer comprising the first particulate solids is formed on the outer surface. The surface slurry layer is polished 106 to a predetermined thickness and/or surface finish. After polishing, a ceramic tape comprising second particulate solids is applied 108 to the surface slurry layer. Pressure is applied 110 to the ceramic tape to attach the ceramic tape to the surface slurry layer and to induce consolidation of the ceramic tape and the surface slurry layer. Thus, a multilayer surface region comprising (a) the surface slurry layer and (b) a ceramic tape layer comprising the second particulate solids is formed on the ceramic fiber preform. The ceramic fiber preform and the multilayer surface region are then infiltrated 112 with a molten material, and, upon cooling 114, a densified CMC component having an engineered surface is formed.

The surface slurry may be applied to the outer surface by spraying, dipping or brushing, typically under ambient conditions. For example, the surface slurry may be applied at room temperature (15° C. to 25° C.) and atmospheric pressure. The surface slurry (and the overlying ceramic tape) may be applied to only a portion of or to an entirety of the outer surface, e.g., to a single surface or to multiple surfaces and edges, such that the engineered surface formed from the method overlies all or only part of the CMC component. After application, any excess surface slurry may be removed from the outer surface prior to drying.

The drying of the surface slurry to remove the liquid carrier may be carried out at room temperature or at an elevated temperature (e.g., from about 30° C. to about 100° C.) in an ambient or controlled environment, such as under vacuum conditions or in an inert gas atmosphere. Drying may take place over a time duration from about two hours to about 24 hours.

The polishing of the surface slurry layer to a predetermined surface finish and/or thickness may be carried out with sandpaper, an abrasive slurry, an abrasive belt or polishing pad, or another polishing or machining method known in the art. The surface finish of the surface slurry layer may correspond to an average surface roughness $R_a$ of about 300 micro-in or less, or about 100 micro-in or less. The thickness of the surface slurry layer may be in a range from about 25 microns to about 800 microns. After polishing and prior to the application of the ceramic tape, an organic binder may be applied to (e.g., sprayed on) the surface slurry layer to facilitate initial attachment if the ceramic tape to the surface.

Once the surface slurry layer has been rendered tacky by the organic binder, the ceramic tape may be applied to the surface slurry layer and exposed to a suitable pressure. Typically, the pressure is in a range from about 500 psi to about 50,000 psi (50 ksi). Preferably, the pressure is at least about 1000 psi, at least about 2000 psi, or at least about 5000 psi to induce consolidation of the ceramic tape and the surface slurry layer and to promote adhesion of the ceramic tape. The term "consolidation" refers to the reduction in thickness and consequent increase in solids loading (vol. %) that occurs as pressure is applied to the ceramic tape, and indirectly to the surface slurry layer. Pressures up to about 20,000 psi, or up to about 50,000 psi, may be suitable. The pressure may be applied to the ceramic tape by lamination, autoclaving, vacuum bagging, isostatic pressing, or another method known in the art. As the pressure is applied, the ceramic tape may also be heated at a low temperature in a range from about 30° C. to about 200° C. to promote softening of any organic components (e.g., the organic binder). The pressure application and resulting consolidation may ensure that the multilayer surface region has a prescribed thickness prior to melt infiltration. After melt infiltration, the engineered surface may have a thickness in a range from about 10 microns to about 1 mm.

It should be noted that a number of (plurality of) ceramic tapes may be applied at different regions on the surface slurry layer to cover all or part of the outer surface, in which case a number of ceramic tapes may form a single ceramic tape layer. Also or alternatively, a number of ceramic tapes may be overlaid on the surface slurry layer to achieve a desired thickness of the multilayer surface region and/or for composition control, as discussed below. Typically, a single ceramic tape has a thickness in a range from about 25 microns to about 1,000 microns. Depending on the number of ceramic tapes applied (overlaid), the thickness of each ceramic tape, and the extent of consolidation as the pressure is applied, the ceramic tape layer(s) may have a thickness in a range from about 10 microns to about 1 mm. When more than one ceramic tape is used, the application of each ceramic tape to the surface may occur prior to the application of pressure, such that all of the ceramic tapes are consolidated simultaneously. Alternatively, pressure may be applied to each ceramic tape sequentially (e.g., after application of a first ceramic tape to the surface and prior to application of a second ceramic tape), such that the consolidation occurs in a multi-step process.

The infiltration with the molten material ("melt infiltration") to densify the ceramic fiber preform and the multilayer surface region is carried out at a temperature at or above the melting temperature (Tm) of the metal or alloy employed for infiltration. Silicon or silicon alloys may be used for the melt infiltration of silicon carbide fiber preforms; in this case, melt infiltration may occur at a temperature in a range from about 1414° C. (™ of silicon) to about 1500° C. Typically, melt infiltration is carried out for a time duration of several minutes to hours, depending on the size and complexity of the component. Upon cooling of the molten material, a CMC component with an engineered surface is formed. The CMC component may be a gas turbine engine component such as a seal segment, blade, vane or combustor liner.

The first particulate solids employed in the surface slurry may include Si, SiC, silicon oxycarbide and/or $Si_3N_4$ and may have a nominal particle size in a range from about 100 nm to about 10 microns. More typically the nominal particle size of the first particulate solids ranges from about 500 nm to about 5 microns. The liquid carrier may include water or an organic solvent such as ethanol, methanol, isopropyl alcohol, methyl ethyl ketone, and/or toluene. The surface slurry may further include a dispersant or surfactant such as ammonium polyacrylate, polyvinyl butyral, a phosphate ester, polyethylene imine, or BYK® 110 (Byk USA, Wallingford, Conn.), and/or an organic binder, such as polyethylene glycol, an acrylate co-polymer, a latex co-polymer, and/or polyvinyl butyral. In some cases, a preceramic polymer such as polycarbosilane, polysiloxane, or polysilazane, and/or a carbon-based resin such as phenolic or furfuryl alcohol, may be included in the surface slurry. The surface slurry may be prepared by ball milling in iterative stages, where components of the slurry are gradually mixed in with the first particulate solids. Typically, the surface slurry comprises a solids loading (primarily the first particulate solids) from about 10 vol. % to about 70 vol. %, or from about 30 vol. % to about 70 vol. %.

The second particulate solids employed for the ceramic tape may comprise one or more materials such as Si, silicon oxycarbide, $Si_3N_4$, SiC, $Y_2Si_2O_7$, $Yb_2Si_2O_7$, $Y_2SiO_5$, and $Yb_2SiO_5$, and may have a nominal particle size in a range from about 100 nm to about 10 microns. More typically the nominal particle size of the second particulate solids is from about 500 nm to about 5 microns. The ceramic tape may further include a dispersant or surfactant and an organic binder, as described above for the surface slurry. The ceramic tape may also include one or more plasticizers. Typically, the ceramic tape comprises a solids loading (primarily or exclusively the second particulate solids) from about 10 vol. % to about 70 vol. %, or from about 30 vol. % to about 70 vol. %. Typically the ceramic tape is prepared by tape casting of a slurry prepared as described above onto a flexible polymeric backing, followed by drying of the slurry and separation of the ceramic tape from the backing.

The ceramic fiber preform comprises a framework of continuous ceramic fibers, such as a two- or three-dimensional weave of the ceramic fibers formed using fiber assembly and coating processes (e.g., interphase coating and rigidization methods) known in the art. The ceramic fibers typically comprise silicon carbide, but may also or alternatively comprise another ceramic, such as silicon nitride, alumina, or aluminosilicate, or carbon. The ceramic fiber preform may be an impregnated fiber preform comprising the framework of ceramic fibers loaded with particulate matter, such as silicon carbide and/or other ceramic particles (e.g., silicon nitride, silicon oxycarbide). The impregnated fiber preform is typically formed prior to application of the surface slurry using slurry infiltration methods known in the art. The densified CMC component formed upon melt infiltration and cooling includes the ceramic fibers in a ceramic matrix. The ceramic matrix may comprise silicon carbide, silicon oxycarbide, silicon nitride, alumina, aluminosilicate, and/or boron carbide or another refractory carbide. In a preferred embodiment, the ceramic fibers comprise silicon carbide and the ceramic matrix also comprises silicon carbide. The CMC component that is formed in this case may be referred to as a silicon carbide/silicon carbide or SiC/SiC composite component. As used herein, the term "silicon carbide" refers broadly to the compound SiC as well as to other silicon-containing carbides.

As mentioned above, the method allows for local modification of the composition of the CMC component at the surface. The materials of the surface slurry layer and the ceramic tape layer may be different, such that the engineered surface produced upon melt infiltration includes a locally modified composition. For example, it may be desirable to impart environmental barrier properties (e.g., thermal stability and resistance to oxygen and water vapor) to the engineered surface. In this case, the second particulate solids of the ceramic tape layer may include an environmental barrier material such as a yttrium or ytterbium silicate (e.g., $Y_2Si_2O_7$, $Yb_2Si_2O_7$, $Y_2SiO_5$, and $Yb_2SiO_5$), and the first particulate solids of the surface slurry layer may include Si in order to form a porous silicon layer on the ceramic fiber preform that becomes, upon melt infiltration, a dense silicon layer. In such an example, the engineered surface on the CMC component may include a silicon bond coat underlying an environmental barrier layer.

By including multiple layers (such as a surface slurry layer and one or more ceramic tape layers) of different compositions, it is possible to produce a multilayer surface region that has a graded composition, i.e., a composition that varies across the thickness thereof. For example, a ceramic tape may include two (or more) different materials, and a number of ceramic tapes including varying amounts of the different materials may be applied to the ceramic fiber preform on the surface slurry layer. Upon exposure to a suitable pressure, multiple ceramic tape layers having a graded composition across the layers may be formed. For example, a first material ("A material") used in the ceramic tape may be environmental barrier material, such as a yttrium or ytterbium silicate, and a second material ("B material") used in the ceramic tape may be a ceramic matrix material, such as silicon carbide. The sequence of ceramic tapes applied to the ceramic fiber preform may include, in this example, a first ceramic tape where 100 vol. % of the second particulate solids comprises the A material, a second ceramic tape where 70 vol. % of the second particulate solids comprises the A material and 30 vol. % comprises the B material, a third ceramic tape where 50 vol. % of the second particulate solids comprises the A material and 50 vol. % comprises the B material, and so on, to an outer-most ceramic tape where 100 vol. % of the second particulate solids comprises the B material. Accordingly, the engineered surface formed after melt infiltration may have a graded composition that varies (e.g., gradually) across the thickness thereof.

It is also contemplated that the second particulate solids of the ceramic tape layer and the first particulate solids of the surface slurry layer may comprise the same material. For example, both the first and second particulate solids may comprise a ceramic matrix material such as SiC, silicon oxycarbide, and/or $Si_3N_4$. Alternatively, both the first and second particulate solids may comprise an environmental barrier material, such as a yttrium or ytterbium silicate. In another example, one or both of the first and second particulate solids may comprise the same material as the particulate ceramic solids slurry infiltrated into the ceramic fiber preform. In such an example, after melt infiltration, the ceramic matrix of the CMC component may have the same or a similar composition to the engineered surface.

The surface slurry applied to the ceramic fiber preform may further include one or more reactive additives selected from the group consisting of graphite, diamond, carbon black, molybdenum, and tungsten. Such additives may promote reactions with the molten material (e.g., silicon or a silicon alloy) during melt infiltration that may reduce or eliminate unreacted silicon metal in the engineered surface. The ceramic tape(s) may also include one or more reactive additives, such as any of those listed above. It may be beneficial for the amount of the reactive additive(s) in the surface slurry to be higher than the amount of the reactive additive(s) in the ceramic tape, particularly in the case of a SiC/SiC composite component, in order to form an increased concentration of SiC (with less unreacted Si metal) near to the CMC component. For example, the surface slurry may include reactive additives in an amount up to about 10 vol. %, whereas the ceramic tape(s) may include reactive additives in an amount up to about 5 vol. %.

Example 1

A surface slurry having a solids loading of 40 vol. % and including SiC powder (2.5 micron nominal size), dispersant, binder, and water is prepared by ball milling for four hours. The surface slurry is de-aired in vacuum for ten minutes, and then sprayed onto the surface of an impregnated ceramic fiber preform (e.g., 1 inch by 1 inch coupon) after slurry infiltration. The surface slurry is dried to form a surface slurry layer, and then the surface slurry layer is polished (e.g., with sandpaper) to smooth out the surface.

Ceramic tapes are fabricated by tape-casting a slurry including ceramic powder (principally SiC), dispersant or surfactant, organic binder, plasticizers and an organic solvent at a loading of about 65 vol. % solids loading. The slurries are prepared by ball milling in iterative stages, e.g., first the ceramic particles are stabilized with dispersant, and then the binder and plasticizer are homogeneously distributed. The slurry is then filtered and finally de-aired, before tape-casting by a doctor blade onto a flexible, silicone-coated Mylar backing material. After drying, the resulting ceramic tape is separated from the backing material. The ceramic tape is then applied to the surface slurry layer, and laminated at a temperature of 100° C. and a pressure of 2,000 psi. Final densification is achieved by silicon alloy melt infiltration.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of forming a ceramic matrix composite (CMC) component having an engineered surface, the method comprising:
   applying a surface slurry to an outer surface of a ceramic fiber preform, the surface slurry including first particulate solids in a liquid carrier;
   drying the surface slurry to remove the liquid carrier, thereby forming a surface slurry layer comprising the first particulate solids on the outer surface;
   polishing the surface slurry layer to a predetermined thickness and/or surface finish;
   after polishing, applying a ceramic tape to the surface slurry layer, the ceramic tape comprising second particulate solids,
   applying pressure to the ceramic tape to attach the ceramic tape to the surface slurry layer and to induce consolidation of the ceramic tape and the surface slurry layer, thereby forming a multilayer surface region comprising the surface slurry layer and a ceramic tape layer on the ceramic fiber preform;

infiltrating the ceramic fiber preform and the multilayer surface region with a molten material, and forming, upon cooling, a CMC component having an engineered surface.

2. The method of claim 1, wherein the surface slurry is applied by spraying, dipping, or brushing.

3. The method of claim 1, wherein the surface slurry is dried at an elevated temperature from about 30° C. to about 100° C.

4. The method of claim 1, wherein the predetermined surface finish corresponds to an average surface roughness $R_a$ of about 300 micro-in or less.

5. The method of claim 1, wherein the predetermined thickness is in a range from about 25 microns to about 800 microns.

6. The method of claim 1, further comprising, after polishing and prior to applying the ceramic tape, applying an organic binder to the surface slurry layer to promote initial attachment of the ceramic tape.

7. The method claim 1, wherein the pressure applied to the ceramic tape is in a range from about 500 psi to about 50,000 psi.

8. The method of claim 1, wherein the pressure is applied by lamination, autoclaving, vacuum bagging, or isostatic pressing.

9. The method of claim 1, further comprising, as the pressure is applied, heating the ceramic tape at a temperature in a range from about 30° C. to about 200° C.

10. The method of claim 1, further comprising applying a plurality of the ceramic tapes to the surface slurry layer.

11. The method of claim 1, wherein the surface slurry further comprises one or more reactive additives selected from the group consisting of graphite, diamond, carbon black, silicon, molybdenum, and tungsten.

12. The method of claim 11, wherein the ceramic tape further comprises the one or more reactive additives, and
wherein an amount of the one or more reactive additives in the surface slurry is higher than an amount of the one or more reactive additives in the ceramic tape.

13. The method of claim 1, wherein the first particulate solids comprise a material selected from the group consisting of: Si, SiC, silicon oxycarbide, and $Si_3N_4$.

14. The method of claim 1, wherein the second particulate solids comprise a material selected from the group consisting of: Si, silicon oxycarbide, $Si_3N_4$, SiC, $Y_2Si_2O_7$, $Yb_2Si_2O_7$, $Y_2SiO_5$, and $Yb_2SiO_5$.

15. The method of claim 1, wherein the first particulate solids comprise the same material as the second particulate solids.

16. The method of claim 1, wherein the first particulate solids comprise a different material from the second particulate solids.

17. The method of claim 1, wherein the second particulate solids comprise two or more different materials, and
wherein a plurality of the ceramic tapes are applied to the surface slurry layer, the ceramic tapes comprising varying amounts of the two or more different materials.

18. The method of claim 17, wherein the engineered surface comprises a graded composition that varies across a thickness thereof.

19. The method of claim 1, wherein the engineered surface includes a silicon bond coat underlying an environmental barrier layer.

20. The method of claim 1, wherein the engineered surface comprises a thickness in a range from about 10 microns to about 1 mm.

21. The method of claim 1, further comprising, before applying the surface slurry to the outer surface, infiltrating the ceramic fiber preform with a ceramic slurry comprising particulate ceramic solids in a carrier liquid.

22. The method of claim 1, wherein the ceramic fiber preform comprises SiC fibers, and wherein the molten material comprises a silicon melt or a silicon alloy melt.

23. A CMC component for gas turbine engine applications made by the method of claim 1.

* * * * *